United States Patent [19]

Morris et al.

[11] Patent Number: 4,813,974

[45] Date of Patent: Mar. 21, 1989

[54] REMOVAL OF EXCESS HALIDE IONS IN AQUEOUS LIQUID FORMULATIONS OF BASIC DYESTUFFS

[75] Inventors: Susan M. Morris, Moncks Corners; Margaret D. Ellis, Mt. Pleasant; Thomas J. Thomas, Summerville, all of S.C.

[73] Assignee: Mobay Corporation, Pittsburgh, Pa.

[21] Appl. No.: 65,197

[22] Filed: Jun. 22, 1987

[51] Int. Cl.$^4$ .............................................. C09B 67/34
[52] U.S. Cl. ....................................... 8/657; 210/683; 422/7; 422/12
[58] Field of Search ..................... 8/657; 422/7, 12; 210/681, 683

[56] References Cited

U.S. PATENT DOCUMENTS

| | | | |
|---|---|---|---|
| 4,311,811 | 1/1982 | Manziek | 502/162 X |
| 4,311,812 | 1/1982 | Manziek | 502/159 X |
| 4,348,475 | 9/1982 | Wernicke | 430/399 |
| 4,478,722 | 10/1984 | Boom | 210/672 |

*Primary Examiner*—William R. Dixon, Jr.
*Assistant Examiner*—James M. Hunter, Jr.
*Attorney, Agent, or Firm*—Gene Harsh; Joseph C. Gil; Richard E. L. Henderson

[57] ABSTRACT

There is disclosed a procedure for reducing the halide content of cationic or basic dyes and consequently the corrosive effect of aqueous formulations of these dyes on stainless steel. The dyes are incorporated into aqueous formulation which may range from neutral to acidic and exposed to an anionic exchange resin. Suitable techniques include stirring beads of the resin into the aqueous formulation and passing the aqueous formulation through an ion exchange column.

18 Claims, No Drawings

REMOVAL OF EXCESS HALIDE IONS IN AQUEOUS LIQUID FORMULATIONS OF BASIC DYESTUFFS

FIELD OF THE INVENTION

The present invention is concerned with reducing the corrosive effect of basic dyes in aqueous solution or dispersion by modifying the halide ion contents of their formulations.

BACKGROUND OF THE INVENTION

The common methods of manufacturing basic dyes can result in final formulations that display an undesirable corrosive effect on metal components of dye handling equipment. In particular, it is typical to use chloride ions as the anionic counter ions to these cationic dye molecules and to use excess amounts of chloride compounds, such as rock salt, to isolate the finished dyestuff from its synthesis bath. In the synthesis of the dye it is convenient to have it in solution but, of course, it then must be recovered from the reaction medium, often an aqueous acid solution. A very common technique is to drive the dye from solution or "salt it out" by the addition of common salt (sodium chloride). In some cases, particularly with readily water soluble dyes, it may not be possible to wash the dye free of this precipitating salt. This residual salt may cause corrosion problems, particularly in dye formulations which are normally acidic. For instance in order to obtain sufficiently concentrated liquid compositions, some basic dyes, such as Color Index Basic Blue 1, are formulated with substantial amounts of glacial acetic acid. Such acidic formulations have been observed to cause significant corrosion of chloride ion sensitive materials of construction such as 316 stainless steel.

SUMMARY OF THE INVENTION

The present invention involves reducing the halide ion content of neutral to acidic aqueous formulations of cationic dyes by treating them with an ion exchange resin. The dye should be treated with an anionic ion exchange resin having a capacity sufficient to absorb a substantial portion, preferably all, of the excess halide ion. However, it is preferred to leave a stoichiometric amount of halide ion relative to the cationic dye.

DETAILED DESCRIPTION OF THE INVENTION

The dyes which may be beneficially treated in accordance with the procedure of the present invention include cationic or basic dyes whose aqueous liquid formulations have acidic pH values and whose anionic counter ions are halides, preferably chlorides. A particularly interesting class of such dyes are the triaryl methanes. However, halide neutralized dyes of the acridine, azine, and azo classes can also be advantageously subjected to the present procedure. Suitable acridine dyes include chrysanitine, benzo flavine, Acridine Orange R, Flaveosine, Brilliant Phosphine, Acriflavine and Proflavine. Suitable azine dyes include azines, oxazines and thiazines such as Safranine, Indulines, methylene violet, meldola blue, Nile Blue A, methylene blue and methylene green. Suitable azo dyes include chrysoidine Y and the extensive list provided in British Patent No. 1,262,301.

The preferred class of triaryl methanes includes both the triphenyl methanes and the diphenyl naphthyl methanes. Encompassed within these groups are the diaminotriaryl methanes of the Malachite Green series and the triamino triaryl methanes of the Fuchsine series. Included in the latter group are series Para Magenta, the phenylated Fuchsines (Spirit blues) such as Spirit Sky Blue and Spirit Blue, the alkylated Fuchsines such as Methyl Green and Methyl Violet B, Crystal Violet, and the Victoria Blues such as Victoria Blue B. Included in the former group, which is particularly preferred, is Malachite Green itself and the Patent Blues such as Chrome Turquoise Blue B and the especially preferred Setoglaucine (Rhoduline Blue G or Color Index Basic Blue 1).

The cationic dyes may be treated with any ion exchange resin capable of absorbing halide ions. Included among such resins are the anion exchange resins based upon at least partially cross-linked polymers bearing basic or cationic groups, particularly ammonium groups including quaternary ammonium groups. A particularly preferred group of such anion exchange resins are based upon the polymerization product of styrene and divinyl benzene with pendant secondary or tertiary amine or quaternary ammonium groups. The precise nature of these groups is not critical to the present invention and they may range from weakly basic to strongly basic. However, inasmuch as the halide ions are readily absorbed by even the weakly basic resins it is preferred to use such resins and thus avoid prematurely exhausting the resin capacity with ions of weaker affinity whose removal is not required and also avoid the danger of a localized zone of high pH which might have an adverse effect on the dye molecule being treated. The capacity of the ion exchange resin is also not critical although resins with capacities between about 1 and 2.2 milliequivalents per milliliter are convenient because they are readily available. Particularly suitable macro porous, anionic exchange resins are taught in U.S. Pat. Nos. 3,549,562; 3,637,535 and 3,716,482. These resins are obtained by polymerizing styrene and divinyl benzene in an appropriate ratio in the presence of appropriate organic solvent followed by amination with primary, secondary or tertiary amines, typically via halomethylation with agents such as chloro methyl methylether and subsequent halogen displacement. Particularly preferred among these resins are those which are substituted with primary or secondary amines and are consequently weakly basic.

The cationic dye may be treated with any quantity of ion exchange resin but it is preferred to use no more than will absorb all the excess halide ions and will leave substantially all of the dyestuff in its halide salt form. An excess of ion exchange resin may be used but this can result in reducing the aqueous solubility of the dye and in some cases can adversely effect the coloristic properties of the dye. For instance in the case of Color Index Basic Blue 1 a reversion to the colorless leuco base can occur upon removal of the halide, particularly chloride, ion. It is particularly preferred to use sufficient ion exchange resin to remove substantially all of the excess halide ion although any significant removal should yield benefits in reduced corrosiveness and enhanced aqueous solubility. It is, of course, possible to remove all or any portion of the halide ions directly associated with the dye molecules and subsequently provide alternative counter ions provided the temporary exposure to substantially higher pH does not have an adverse effect on the dye molecule. A convenient substitute counter ion is the acetate ion.

A preferred technique is to determine the excess halide ion content of the cationic dye to be treated and then to add an appropriate amount of ion exchange resin to an aqueous bath of this dye. A convenient approximation for determining the appropriate amount of anion exchange resin is to assume that the resin will remove halide ion up to its rated equivalents capacity. Both the time of treatment and the temperature of treatment is dependent on the characteristics of the particular exchange resin which is utilized. Anion exchange resins are commercially available which will give satisfactory performance if simply stirred with an aqueous bath of the dye for about an hour at room temperature.

It is also possible to pass an aqueous bath of the cationic dye through an ion exchange column. However, in such a technique, there is a greater danger of exposing the dye to a high local pH condition and thus causing irreversible damage. In such a procedure it is preferred that the total capacity of the column be matched with the excess halide content of a single batch of dye being treated. Thus, once the batch has been completely treated the halide ion content will be at the appropriate level even though earlier in the processing the halide ion content of some of the material in progress may have temporarily gone below the desired amount.

It may be convenient to adjust the pH of the treated dye back to the level it displayed before treatment. The solubility and other characteristics of many aqueous liquid cationic dye formulations are dependent upon the pH of the formulation. Typically anion exchange resins remove halide ions by exchanging them for hydroxyl groups. Thus, treating the dye formulation will cause an increase in its hydroxyl ion content and consequently its pH. This can be conveniently accomplished by adding an appropriate amount of an acid such as glacial acetic acid.

The procedures of the present invention may be applied to any amount of liquid dye formulation. However, they are particularly valuable when applied to commercial size batches. It is an important feature of the present discovery that these procedures can result in an effective amount of halide ion content reduction of such size batches without adverse effects on any of the other properties of the treated material. Often procedures that work well in laboratory or pilot plant scale can not be scaled up to production qualities for a variety of subtle and sometimes unascertainable reasons. Such is not the case with the present procedure and it may readily be applied to batches of in excess of 1000 pounds preferably in excess of 5000 pounds and most preferably in excess of 10,000 pounds of liquid dye formulation.

One major benefit obtained by reducing the halide ion content of an aqueous cationic dye formulation is a reduction of its tendency to cause corrosion. This is of particular importance if the formulation is used in equipment which is subject to attack by halide, particularly chloride, ions. One common material of construction which is susceptible to such attack is 316 stainless steel. This benefit can be quantitated by measuring the corrosion rate in mils per year in accordance with well established tests such as the National Association of Corrosion Engineers Standard TM-01-69, Laboratory Corrosion Testing of Metal for the Process Industries. Generally, this is determined by immersing a thin circular or rectangular metal specimen in the liquid dye formulation for a fixed period at the anticipated operating temperature, normally room temperature (20° C.), for a fixed period and determining the weight loss of the specimen. Significant benefits in this corrosion rate can be obtained by reduction of the excess halide ion content.

The removal of less than all the excess halide ion has a measurable effect on the corrosion rate. Reduction of the excess halide content to 30 percent by weight over the amount needed to act as a counterion to the dye molecule gives a substantial improvement in corrosion rate. Further improvements are observed as this excess halide content is further reduced. A reduction to an excess of 22 percent by weight or less results in a corrosion rate for 316 stainless steel of less than two mils per year. For instance Color Index Basic Blue 1 has molecular weight of 399 of which 8.9% is the chloride ion. A typical formulation contains approximately 36 weight percent of dyestuff so that the stoichiometric chloride ion content is 3.2 weight percent. A substantial improvement in the corrosion rate is observed at chloride ion contents of about 4.2 weight percent with further improvements evident at contents of 3.9 weight percent and less.

The invention is further illustrated but is not intended to be limited by the following examples.

EXAMPLES

Example 1

Two hundred grams of a formulation of Color Index Basic Blue 1 containing 72.6 grams of dye in water and acetic acid was mixed with 30 grams of beads of an anionic exchange having a theoretical exchange capacity of approximately 1.75 mmol/gram and stirred for one hour, at room temperature. The dye formulation had a chloride ion content of 4.4 weight percent. The ion exchange resin was a macroporous styrene divinyl benzene polymerization product with pendant tertiary amine groups having a density of 1.03 grams/milliliter, a water content of between about 45 and 55 weight percent water, a bead size range of between about 0.3 and 1.25 mm and an average bead size of 0.41 mm. It is available from Mobay Corporation as Lewatit MP 62. The dye formulation was separated from the ion exchange resin beads by filtration. The treated dye formulation had a chloride ion content of 3.0 weight percent. The pH was adjusted with acetic acid to approximately 3.15 as measured at a 10% strength in water.

The corrosiveness of the formulation to 316 stainless steel was tested using a 2"×1"×1/16" coupon with a forty eight hour test period at 55° C. in accordance with standard TM-01-69 of the National Association of Corrosion Engineers. The corrosion rate was 1.1 mils per year while that of the untreated formulation was 9.9 mils per year.

Example 2

The procedure of Example 1 was repeated except that the stirring time with the beads of ion exchange resin was increased to 5½ hours. The chloride ion content was 3 weight percent and the corrosion rate was 1.0 mils per year.

Example 3

The procedure of Example 1 was repeated except that the mixture of dye formulation and ion exchange resin beads was heated to 38° C., held for one hour at temperature, and then stirred for an additional 2½ hours while it was allowed to cool. The chloride ion content was 3.0 weight percent and the corrosion rate was 1.3 mils per year.

Example 4

The procedure of Example 1 was repeated except that 3.6 grams of glacial acetic acid was added to the formulation before mixing with the ion exchange resin beads. The chloride ion content was 2.9 weight percent and the corrosion rate was 0.97 mils per year.

Example 5

The procedure of Example 1 was repeated except that only 20 grams of the ion exchange resin beads were used and 1.5 grams of glacial acetic acid was added to the treated clarified dye formulation. The chloride ion content was 3.4 weight percent and the corrosion rate was 1.3 mils per year.

Example 6

The procedure of Example 1 was essentially repeated except that only 100 grams of dye formulation and 5 grams of ion exchange resin beads were used. The chloride ion content was 3.9 weight percent and the corrosion rate was 1.36 mils per year.

Example 7

The procedure of Example 1 was essentially repeated except that only 5 grams of ion exchange resin beads were used with 200 grams of dye formulation. The chloride ion content was 4.2 weight percent and the corrosion rate was 1.9 mils per year.

Example 8

A lot of approximately 12,000 pounds of dye formulation of water, acetic acid and 36.3 weight percent Color Index Basic Blue 1 was stirred for one hour with 600 pounds of the beads of the anionic exchange resin described in Example 1. The dye formulation was then filtered to remove the ion exchange resin beads. The spectral strength was adjusted to standard strength by the addition of about 60 pounds of glacial acetic acid. The chloride ion content had been reduced from 4.4 to 3.8 weight percent and the corrosion rate was 1.7 mils per year.

Example 9

Five hundred grams of the dye formulation of Example 1 were treated by passage through a vertical ion exchange column. The column was one inch in diameter and was filled to a height of 12.625 inches with 100 grams of the anionic exchange resin described in Example 1. The dye formulation was pumped through the column from top to bottom at a rate of 35.7 milliliters per minute giving an average residence time of about 4.6 minutes. The chloride ion content was reduced from 4.4 to 3.0 weight percent. The dye tested 104 parts equal to 100 parts of standard and was a trace slightly green and a trace slightly dull at 1% strength. It exhausted equal to the standard.

Example 10

Example 9 was repeated except that the column was only filled to a height of 9.75 inches with 77.4 grams of anionic exchange resin and the flow rate was about 38 milliliters per minute giving an average residence time of 3.3 minutes. The chloride ion content was reduced from 4.4 to 3.2 weight percent and the corrosion rate was 1.49 mils per year.

Example 11

Example 9 was repeated except that the column was only filled to a height of 6.5 inches with 50.2 grams of the anionic exchange resin and the flow rate was about 58.5 milliliters per minute giving a residence time of about 1.4 minutes. The chloride ion content was reduced from 4.4 to 3.6 weight percent and the corrosion rate was 1.4 mils per year.

Example 12

The procedure of Example 9 was repeated except that the column was filled to a height of 3.25 inches with 25.9 grams of anionic exchange resin and the flow rate was about 82.5 milliliters per minute giving a residence time of about ½ minute. The chloride ion content was reduced from 4.4 to 3.9 weight percent and the corrosion rate was 1.81 mils per year.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for reducing the excess halide ion content of a cationic dye formulation comprising
   (a) preparing a neutral to acidic aqueous formulation of the dye, and
   (b) exposing said formulation to an anionic exchange resin, thereby reducing the halide ion content of said dye formulation.

2. The process of claim 1 wherein the halide ion is a chloride ion.

3. The process of claim 1 or 2 wherein the cationic dye is a triaryl methane.

4. The process of claim 1 wherein the capacity and amount of the exchange resin and the exposure time is sufficient to reduce the halide ion content of the dye formulation to no more than 30 weight percent in excess of the stoichiometric amount necessary to act as a counterion to the cationic dye fragment.

5. The process of claim 1 or 4 wherein the anion exchange resin is a macroporous polymerization product of styrene and divinyl benzene with pendant primary, secondary or tertiary amine groups.

6. The process of claim 5 wherein the exchange resin has a capacity between about 1 and 2.2 milliequivalents per milliliter and is weakly basic.

7. The process of claim 3 wherein the halide ion content of the dye formulation is reduced to within 130 weight percent or less of the amount needed to stoichiometrically balance the cationic groups on the dye molecule.

8. The process of claim 7 wherein the dye is a triphenyl methane or a diphenyl naphthyl methane.

9. The process of claim 8 wherein the dye is a diaminotriaryl methane.

10. The process of claim 9 wherein the dye is Color Index Basic Blue 1.

11. A process for reducing the corrosive effect on stainless steel of acidic aqueous formulations of cationic dyes which contain more than stoichiometric amounts of halide ion relative to the dye molecular comprising treating such formulations with an anionic exchange resin, thereby reducing the amount of halide ion.

12. The process of claim 11 wherein the anionic exchange resin is stirred with the dye formulation and then removed by filtration.

13. The process of claim 11 wherein the dye formulation is passed through a constrained bed of the anionic exchange resin.

14. The process of claim 11 wherein the corrosive effect of the dye formulation on 316 stainless steel is reduced to less than 2 mils per year when tested at 55° C. in accordance with Standard TM-01-69.

15. The process of claim 11 wherein the halide content is reduced to less than about 130 weight percent of the stoichiometric amount relative to the cationic dye fragment.

16. The process of claim 15 wherein the halide content is reduced to less than about 122 weight percent of said stoichiometric amount.

17. The process of claim 11 wherein a commercial size batch of more than 1000 pounds of the formulation is treated.

18. A process for reducing the corrosive effect on 316 stainless steel of aqueous acidic formulations of Color Index Basic Blue 1 containing chloride ion in excess of that needed to act as counterion to the cationic portion of the dye molecule to less than 2 mils per year at 55° C. comprising
   (a) treating said formulations with a weakly basic macroporous anionic exchange resin, which is the polymerization product of styrene and divinyl benzene and which has pendant amine groups, to reduce the chloride ion content to less than about 4.2 weight percent, and
   (b) separating said formulations from said resin.

* * * * *